United States Patent
Jia et al.

(10) Patent No.: US 11,073,533 B2
(45) Date of Patent: Jul. 27, 2021

(54) ELECTRONIC DEVICE AND METHOD FOR DETECTING SWIPING OF CARD

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Shi Jia, Zhengzhou (CN); Jun-Wei Zhang, Zhengzhou (CN); Jun Zhang, Shenzhen (CN); Yi-Tao Kao, New Taipei (TW)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/742,055

(22) Filed: Jan. 14, 2020

(65) Prior Publication Data
US 2021/0003603 A1 Jan. 7, 2021

(30) Foreign Application Priority Data
Jul. 2, 2019 (CN) .......................... 201910588198.2

(51) Int. Cl.
*G01P 3/68* (2006.01)
*G06F 3/16* (2006.01)
*G06K 7/10* (2006.01)

(52) U.S. Cl.
CPC ................ *G01P 3/68* (2013.01); *G06F 3/167* (2013.01); *G06K 7/10128* (2013.01)

(58) Field of Classification Search
CPC ................................... G01P 3/68; G06F 3/167
See application file for complete search history.

(56) References Cited

U.S. PATENT DOCUMENTS

| | | | | |
|---|---|---|---|---|
| 6,481,623 | B1 * | 11/2002 | Grant | G06K 7/084 235/380 |
| 9,838,520 | B2 * | 12/2017 | Goodman | G06Q 20/3572 |
| 9,847,009 | B2 * | 12/2017 | Walker | G01N 29/4454 |
| 9,922,317 | B2 * | 3/2018 | Bak | G06Q 20/3229 |
| 9,928,670 | B2 * | 3/2018 | Zhao | G07C 9/28 |

* cited by examiner

Primary Examiner — K. Wong
(74) Attorney, Agent, or Firm — ScienBiziP, P.C.

(57) ABSTRACT

A method for detecting swiping of a card applicable in an electronic device controls a motion detecting device to acquire motion data of the electronic device, controls a distance detecting device to detect a distance between the electronic device and a card, determining whether the motion data is within at least one predetermined range of motion data, determines whether the detected distance is less than or equal to a predetermined value; controls the recording device to record sounds at the proximity of the electronic device if the motion data is within the at least one predetermined range of motion data and the detected distance is less than or equal to the predetermined value, determining whether the recorded sounds are the same as responsive sounds of card-swiping; and determines that swiping of the card is successful if the recorded sounds are the same as the responsive sounds of card-swiping.

14 Claims, 3 Drawing Sheets

ELECTRONIC DEVICE AND METHOD FOR DETECTING SWIPING OF CARD

CROSS-REFERENCE TO RELATED APPLICATIONS

This application claims priority to Chinese Patent Application No. 201910588198.2 filed on Jul. 2, 2019, the contents of which are incorporated by reference herein.

FIELD

The subject matter herein generally relates to event detection technology, and particularly to an electronic device and a method for detecting swiping of a card.

BACKGROUND

RF (Radio Frequency) identification cards, such as time cards and payment cards, are usually utilized to carry out various functions in relation to users' daily life, such as recording attendance, accumulating points, making payments, etc. However, due to mis-operation or a failure of swiping machines, a swipe of a card may not be successful, while the card user is not being about an unsuccessful card swiping.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
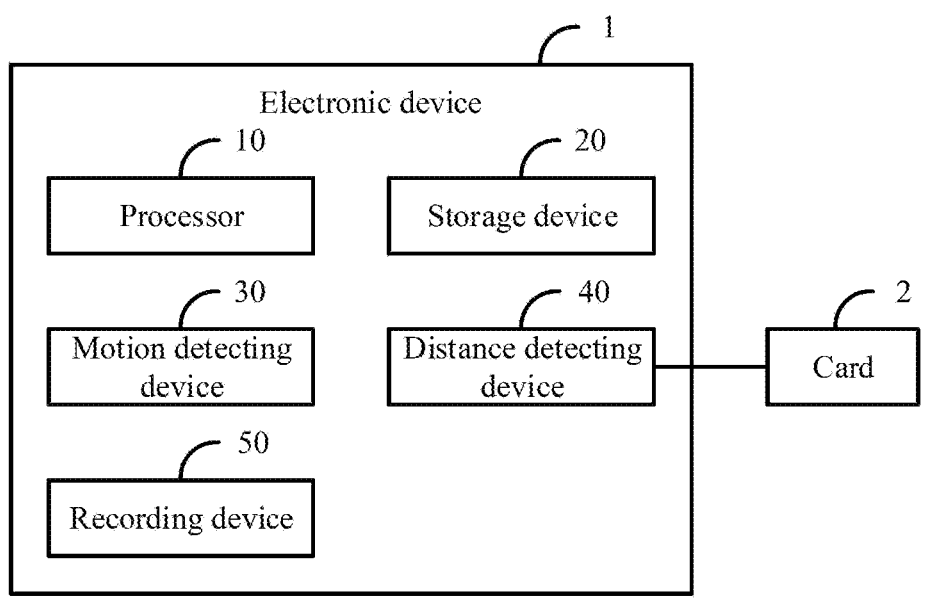
FIG. 1 is a block diagram of an embodiment of an electronic device for detecting swiping of a card.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an embodiment of an electronic device 1. In at least one embodiment, the electronic device 1 can be a smart phone, a smart watch, or a smart bracelet. The electronic device 1 can detect motions of swiping a card of a user, determine whether swiping of the card is successful, and prompt the user accordingly.

The electronic device 1 includes, but is not limited to, a processor 10, a storage device 20, a motion detecting device 30, a distance detecting device 40, and a recording device 50. FIG. 1 illustrates only one example of the electronic device 1, other examples can include more or fewer components than illustrated, or have a different configuration of the various components in other embodiments.

The processor 10 can be a central processing unit (CPU), a microprocessor, or other data processor chip that performs functions of the electronic device 1.

In at least one embodiment, the storage device 20 can include various types of non-transitory computer-readable storage mediums. For example, the storage device 20 can be an internal storage system, such as a flash memory, a random access memory (RAM) for temporary storage of information, and/or a read-only memory (ROM) for permanent storage of information. The storage device 20 can also be an external storage system, such as a hard disk, a storage card, or a data storage medium.

In at least one embodiment, the storage device 20 stores at least one predetermined range of motion data of the electronic device 1 and responsive sounds of card-swiping.

In at least one embodiment, the motion detecting device 30 can be a gyroscope. The motion detecting device 30 detects motions of the electronic device 1 and acquires motion data of the electronic device 1. The motion data can include angular velocities, velocities, and accelerations. In other embodiments, the motion detecting device 30 can also be a gravity meter or a camera.

In at least one embodiment, the distance detecting device 40 is an RFID (Radio Frequency Identification) chip. The distance detecting device 40 can connect with a card 2 carried by the user, and detect a distance between the electronic device 1 and the card 2. The card 2 can be an RF card. In other embodiments, the distance detecting device 40 can also be an infrared sensor.

In at least one embodiment, the recording device 50 can be a microphone. The recording device 50 records sounds at a proximity of the electronic device 1.

Figure 2:
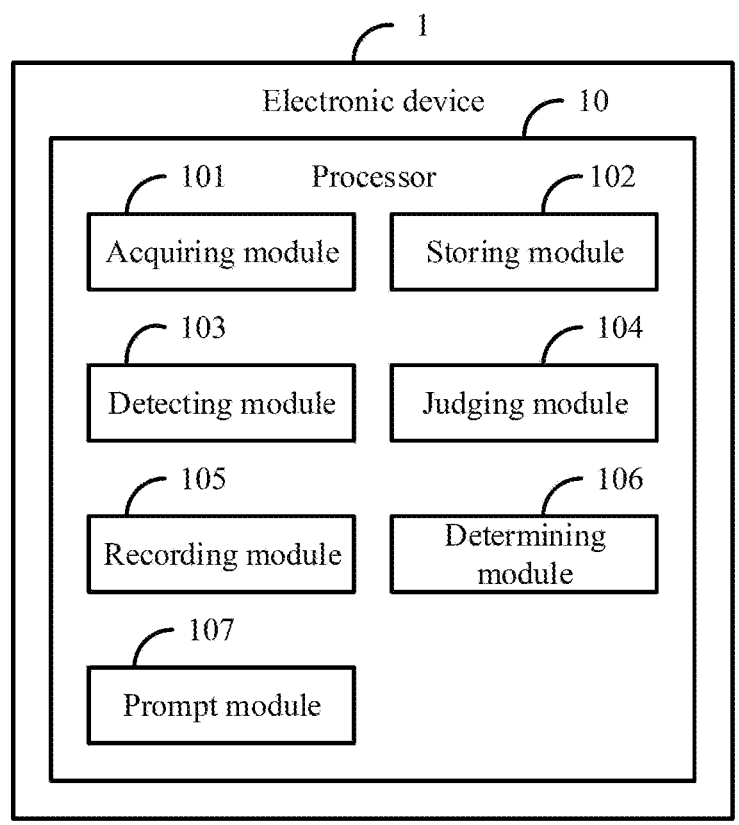
FIG. 2 is a block diagram of an embodiment of modules of the electronic device.

As illustrated in FIG. 2, the electronic device 1 at least includes an acquiring module 101, a storing module 102, a detecting module 103, a judging module 104, a recording module 105, a determining module 106, and a prompt module 107. The modules 101-107 can be collections of software instructions stored in the storage device 20 of the electronic device 1 and executed by the processor 10. The modules 101-107 also can include functionality represented as hardware or integrated circuits, or as software and hardware combinations, such as a special-purpose processor or a general-purpose processor with special-purpose firmware.

The acquiring module 101 is used to control the motion detecting device 30 to acquire motion data of the electronic device 1 each time that a determined motion of card-swiping is performed.

In at least one embodiment, the motion of card-swiping is equal to the motion of swiping a card of the user. The user can perform the determined motion of card-swiping a number of times, so that the electronic device 1 can record the at least one predetermined range of motion data in relation to the motion of card-swiping by machine learning, according to the acquired motion data of the electronic device 1.

In at least one embodiment, the motion data includes at least one angular velocity and at least one velocity of the electronic device 1.

In detail, when the user performs the determined motions of card-swiping, the motion detecting device 30 acquires the angular velocities and the velocities of the electronic device 1. Since the electronic device 1 is a smart watch or a smart bracelet worn on the user's wrist, the angular velocities and the velocities of the electronic device 1 are respectively equal to the angular velocities and the velocities of the user's hand. The card 2 or other object held in user's hand.

The storing module 102 is used to determine at least one predetermined range of motion data according to the motion data of the electronic device 1 acquired by the motion detecting device 30, and stores the at least one predetermined range of motion data to the storage device 20.

In at least one embodiment, the at least one predetermined range of motion data includes a predetermined range of angular velocities and a predetermined range of velocities. The predetermined range of angular velocities is between a minimum value of the number of angular velocities and a maximum value of the number of angular velocities, the predetermined range of velocities is between a minimum value of the number of velocities and a maximum value of the number of velocities.

The acquiring module 101 is further used to control the motion detecting device 30 to acquire the motion data of the electronic device 1.

In at least one embodiment, the acquiring module 101 controls the motion detecting device 30 to acquire the angular velocity and the velocity of the electronic device 1, at a first predefined time intervals within a predefined time range. The predefined time range can be a time range that the user needs to swipe the card 2, such as a work time range, an off-duty time range, a meeting time range, etc. The first predefined time interval can be five seconds. In other embodiments, the first predefined time interval can also be other suitable value.

The detecting module 103 is used to control the distance detecting device 40 to detect a distance between the electronic device 1 and the card 2.

In at least one embodiment, the detecting module 103 controls the distance detecting device 40 to detect the distance between the electronic device 1 and the card 2, at the second predefined time interval within the predefined time range.

In at least one embodiment, the distance detecting device 40 can connect with the card 2 through RF signals. The distance detecting device 40 transmits an RF signal to the card 2, the card 2 can transmit a feedback signal to the distance detecting device 40 when receiving the RF signal.

The distance detecting device 40 determines the distance between the electronic device 1 and the card 2, according to a transmission speed of radio waves and a time interval between transmitting the RF signal and receiving the feedback signal.

The judging module 104 is used to determine whether the motion data of the electronic device 1 is within the at least one predetermined range of motion data.

In at least one embodiment, the judgment module 104 determines whether the acquired angular velocity is within the predetermined range of angular velocities, by comparing the acquired angular velocity of the electronic device 1 with the predetermined range of angular velocities. The judgment module 104 further determines whether the acquired velocity is within the predetermined range of velocities, by comparing the acquired velocity of the electronic device 1 with the predetermined range of velocities.

The judging module 104 is further used to determine whether the distance between the electronic device 1 and the card 2 detected by the distance detecting device 40 is less than or equal to a predetermined value. In at least one embodiment, the predetermined value can be fifteen centimeters. In other embodiments, the predetermined value can also be other suitable value.

In other embodiments, the judging module 104 can determine whether a first sequence of events has occurred according to the distances between the electronic device 1 and the card 2 detected by the distance detecting device 40 at a certain time interval. The first sequence of events at least includes the electronic device 1 approaching the card 2 and the electronic device 1 moving away from the card 2. The certain time interval can be five seconds.

The card 2 may be in user's hand, or can be hung on the user's neck or be in the user's clothing pocket, and the electronic device 1 is on the user's wrist. At this time, there is a certain distance between the electronic device 1 and the card 2. If the card 2 is being picked up by the user, the distance between the electronic device 1 and the card 2 is getting shorter, the electronic device 1 is approaching the card 2. If the card 2 is put somewhere (back around the neck or back into a pocket), the distance between the electronic device 1 and the card 2 increases, the electronic device 1 is further away from the card 2. Thus, if the judging module 104 determines that the electronic device 1 approaches the card 2 and then moves away from the card 2 according to the distances detected by the distance detecting device 40, the judging module 104 determines that the user picks up the card 2 and puts the card 2 back.

In other embodiments, the judging module 104 further determines whether a second sequence of events has occurred according to the distances between the electronic device 1 and the card 2 detected by the distance detecting device 40 at a certain time interval. The second sequence of events comprises the electronic device 1 approaching the card 2, the electronic device 1 maintaining a constant distance from the card 2, and the electronic device 1 moving away from the card 2.

For example, the distances between the electronic device 1 and the card 2 detected by the distance detecting device 40 include 60 cm, 50 cm, 38 cm, 27 cm, 15 cm, 15 cm, 15 cm, 28 cm, 51 cm, and 58 cm. The distance between the electronic device 1 and the card 2 get shorter, kept the predetermined value, and then increased according to the distances. Thus, the judging module 104 can determine that the electronic device 1 has approached the card 2, has kept the distance from the card 2, and then has moved away from the card 2 according to the distances. The judging module 104 can further determine that the user has picked up the card 2, held the card 2, and put the card 2 back.

In other embodiments, the motion detecting device 30 can be a camera, the storage device 20 store at least one predefined image of a motion of card-swiping. The acquiring module 101 controls the motion detecting device 30 to capture an image of the motion of card-swiping. The judging module 104 determines whether the captured image of the motion of card-swiping is identical with the predefined image of motion of card-swiping.

If the judging module 104 determines that the motion data of the electronic device 1 is within the at least one predetermined range of motion data, and the distance between the electronic device 1 and the card 2 is less than or equal to a predetermined value, the recording module 105 is used to control the recording device 50 to record sounds at the proximity of the electronic device 1.

In other embodiments, if the judging module 104 determines that the motion data of the electronic device 1 is within the at least one predetermined range of motion data, and the first or second sequence of events has occurred according to the distances between the electronic device 1 and the card 2 detected by the distance detecting device 40 at the certain time interval, the recording module 105 controls the recording device 50 to record sounds at the proximity of the electronic device 1.

In at least one embodiment, the recording module 105 controls the recording device 50 to record the sound within a predetermined distance range of the electronic device 1. In at least one embodiment, the predetermined distance can be five centimeters.

The judging module 104 is further used to determine whether the sound at the proximity of the electronic device 1 recorded by the recording device 50 is the same as the responsive sounds of card-swiping which are stored in the storage device 20.

In at least one embodiment, the judging module 104 respectively compares parameters and features of sound signals recorded by the recording device 50 with the parameters and features of responsive sound signals of card-swiping.

If the parameters and the features of the two sound signals are the same, the judging module 104 determines that the recorded sounds are the same as the responsive sounds of card-swiping. If the parameters and/or features of the two sound signals are not the same, the judging module 104 determines that the recorded sounds are not the responsive sounds of card-swiping.

In at least one embodiment, the parameters of the sound signal at least include amplitude and frequency, and the features of the sound signal at least include feature of sound pattern.

If the judging module 104 determines that the recorded sounds are the same as the responsive sounds of card-swiping, the determining module 106 determines that the swiping of the card 2 is successful. If the judging module 104 determines that the recorded sounds are not the same as the responsive sounds of card-swiping, the determining module 106 determines that the swiping of the card 2 is not successful.

In at least one embodiment, the responsive sounds of card-swiping can be responsive sounds of a successful card-swiping output by a swipe machine (not shown). If the judging module 104 determines that the recorded sound is the same as the responsive sounds of the successful card-swiping, the determining module 106 determines that the swiping of the card 2 is successful. If the judging module 104 determines that the recorded sounds are not the same as the responsive sounds of the successful card-swiping, the determining module 106 determines that the swiping of the card 2 is not successful.

In other embodiments, the responsive sounds of card-swiping can also be responsive sounds of a failed card-swiping which are output by the swiping machine itself.

In other embodiments, the responsive sounds of card-swiping can include the responsive sounds of the successfully card-swiping and the responsive sounds of the failed card-swiping.

If the judging module 104 determines that the recorded sounds are same as the responsive sounds of the successful card-swiping, the determining module 106 determines that the swiping of the card 2 is successful. If the judging module 104 determines that the recorded sounds are not the same as the responsive sounds of the failed card-swiping, the determining module 106 determines that the swiping of the card 2 is not successful. If the judging module 104 determines that the recorded sounds are neither the same as the responsive sounds of the successful card-swiping nor the responsive sounds of the failed card-swiping, the determining module 106 determines that the swiping of the card 2 is not successful.

If the determining module 106 determines that the swiping of the card 2 is successful, the prompt module 107 is used to output a first message. If the determining module 106 determines that the swiping of the card 2 is not successful, the prompt module 107 is further used to output a second message.

In at least one embodiment, the first and second message can be voice messages. If the determining module 106 determines that the swiping of the card 2 is successful, content of the first message can be "success". If the determining module 106 determines that the swiping of the card 2 is not successful, content of the second message can be "failure, please try again".

In other embodiments, the first and second message can also be text messages displayed on the electronic device 1.

In at least one embodiment, the prompt module 107 is further used to store the recorded sounds at the proximity of the electronic device 1 and the first and second message to the storage device 20, thus a record of the swiping of the card 2 including the recorded sounds at the proximity of the electronic device 1 and the first and second message can be checked on the electronic device 1.

Figure 3:
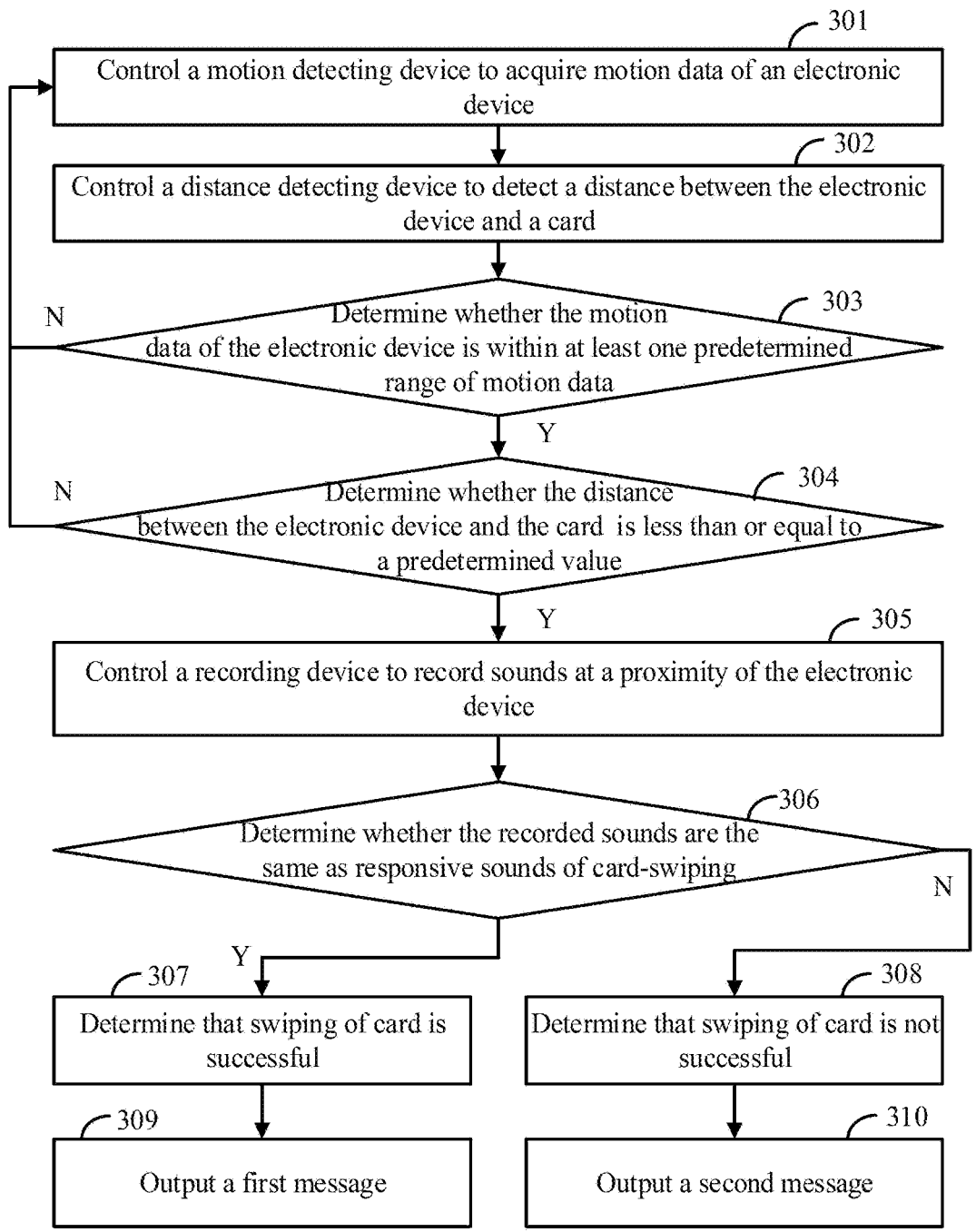
FIG. 3 illustrates a flowchart of an embodiment of a method for detecting card-swiping.

FIG. 3 illustrates a flowchart of an embodiment of a method for detecting swiping of a card. The method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 301.

At block 301, the acquiring module 101 controls the motion detecting device 30 to acquire the motion data of the electronic device 1.

At block 302, the detecting module 103 controls the distance detecting device 40 to detect a distance between the electronic device 1 and the card 2.

At block 303, the judging module 104 determines whether the motion data of the electronic device 1 is within the at least one predetermined range of motion data.

At block 304, the judging module 104 further determines whether the distance between the electronic device 1 and the card 2 detected by the distance detecting device 40 is less than or equal to a predetermined value. If the judging module 104 determines that the motion data of the electronic device 1 is within the at least one predetermined range of motion data and the detected distance between the electronic device 1 and the card 2 is less than or equal to the predetermined value, the process goes to block 305. If the judging module 104 determines that the motion data of the electronic device 1 is not within the at least one predetermined range of motion data or the detected distance between the electronic device 1 and the card 2 is greater the predetermined value, the process goes back to block 301.

At block 305, the recording module 105 controls the recording device 50 to record sounds at the proximity of the electronic device 1.

At block 306, the judging module 104 further determines whether the sounds at the proximity of the electronic device 1 recorded by the recording device 50 are the same as the responsive sounds of card-swiping stored in the storage device 20. If the judging module 104 determines that the sounds at the proximity of the electronic device 1 recorded by the recording device 50 are the same as the responsive sounds of card-swiping, the process goes to block 307. If the judging module 104 determines that the sounds at the proximity of the electronic device 1 recorded by the recording device 50 are not the same as the responsive sounds of card-swiping, the process goes to block 308.

At block 307, the determining module 106 determines that swiping of the card 2 is successful.

At block 308, the determining module 106 determines that the swiping of the card 2 is not successful.

At block 309, the prompt module 107 outputs a first message.

At block 310, the prompt module 107 outputs a second message.

In at least one embodiment, the method for detecting swiping of a card further includes controlling the motion detecting device 30 to acquire the motion data of the electronic device 1 each time that a determined motion of card-swiping is performed, determining the at least one predetermined range of the motion data according to the motion data of the electronic device 1 acquired by the motion detecting device 30, and storing the at least one predetermined range of motion data to the storage device 20.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
   at least one processor;
   a motion detecting device coupled to the at least one processor;
   a distance detecting device coupled to the at least one processor;
   a recording device coupled to the at least one processor; and
   a storage device coupled to the at least one processor and storing instructions for execution by the at least one processor to cause the at least one processor to:
   control the motion detecting device to acquire motion data of the electronic device;
   control the distance detecting device to detect a distance between the electronic device and a card;
   determine whether the motion data of the electronic device is within at least one predetermined range of motion data;
   determine whether the distance between the electronic device and the card detected by the distance detecting device is less than or equal to a predetermined value;
   determine whether a sequence of events has occurred according to the distances between the electronic device and the card detected by the distance detecting device at a certain time interval, wherein the sequence of events comprises the electronic device approaching the card, the electronic device maintaining a constant distance from the card, and the electronic device moving away from the card;
   determine, if the motion data of the electronic device is within the at least one predetermined range of motion data and the sequence of events has occurred according to the distances between the electronic device and the card detected by the distance detecting device at the certain time interval, that the card is picked up, held, and put back by a user;
   control the recording device to record sounds at a proximity of the electronic device;
   determine whether the sounds at the proximity of the electronic device recorded by the recording device are the same as responsive sounds of card-swiping stored in the storage device; and
   determine, if the recorded sounds at the proximity of the electronic device are the same as the responsive sounds of card-swiping, that swiping of the card is successful.

2. The electronic device according to claim 1, wherein the at least one processor is further caused to:
   determine, if the recorded sounds at the proximity of the electronic device are not the same as the responsive sounds of card-swiping, that swiping of the card is not successful.

3. The electronic device according to claim 2, wherein the at least one processor is further caused to:
   determine whether the sounds at the proximity of the electronic device recorded by the recording device are the same as responsive sounds of a successful card-swiping or responsive sounds of a failed card-swiping;
   determine, if the recorded sounds at the proximity of the electronic device are the same as the responsive sounds of the successful card-swiping, that swiping of the card is successful;
   determine, if the recorded sounds at the proximity of the electronic device are the same as the responsive sounds of the failed card-swiping, that swiping of the card is not successful; and
   determine, if the recorded sounds at the proximity of the electronic device are neither the same as the responsive sounds of the successful card-swiping nor the failed card-swiping, that the swiping of the card is not successful.

4. The electronic device according to claim 3, wherein the at least one processor is further caused to:

output a first message if the swiping of the card is determined to be successful; and output a second message if the swiping of the card is determined to be not successful.

5. The electronic device according to claim 1, wherein the at least one processor is further caused to:

control the motion detecting device to acquire the motion data of the electronic device each time that a determined motion of card-swiping is performed;

determine the at least one predetermined range of motion data according to the motion data of the electronic device acquired by the motion detecting device; and store the at least one predetermined range of motion data to the storage device.

6. The electronic device according to claim 5, wherein the motion data comprises angular velocities and velocities, the at least one predetermined range of motion data comprises a predetermined range of angular velocities and a predetermined range of velocities.

7. The electronic device according to claim 6, wherein the at least one processor is further caused to:

control the motion detecting device to acquire the angular velocity and the velocity of the electronic device at a first predefined time intervals within a predefined time range;

determine whether the acquired angular velocity of the electronic device is within the predetermined range of angular velocities; and determine whether the acquired velocity of the electronic device is within the predetermined range of velocities.

8. A method for detecting swiping of a card applicable in an electronic device comprising:

controlling a motion detecting device of the electronic device to acquire motion data of the electronic device;

controlling a distance detecting device of the electronic device to detect a distance between the electronic device and a card;

determining whether the motion data of the electronic device is within at least one predetermined range of motion data;

determining whether the distance between the electronic device and the card detected by the distance detecting device is less than or equal to a predetermined value;

determining whether a sequence of events has occurred according to the distances between the electronic device and the card detected by the distance detecting device at a certain time interval, wherein the sequence of events comprises the electronic device approaching the card, the electronic device maintaining a constant distance from the card, and the electronic device moving away from the card;

determine, if the motion data of the electronic device is within the at least one predetermined range of motion data and the sequence of events has occurred according to the distances between the electronic device and the card detected by the distance detecting device at the certain time interval, that the card is picked up, held, and put back by a user;

controlling a recording device of the electronic device to record sounds at a proximity of the electronic device;

determining whether the sounds at the proximity of the electronic device recorded by the recording device are the same as responsive sounds of card-swiping stored in the storage device; and determining, if the recorded sounds at the proximity of the electronic device are the same as the responsive sounds of card-swiping, that swiping of the card is successful.

9. The method according to claim 8, further comprising:

determining, if the recorded sounds at the proximity of the electronic device are not the same as the responsive sounds of card-swiping, that swiping of the card is not successful.

10. The method according to claim 9, further comprising:

determining whether the sounds at the proximity of the electronic device recorded by the recording device are the same as responsive sounds of a successful card-swiping or responsive sounds of a failed card-swiping;

determining, if the recorded sounds at the proximity of the electronic device are the same as the responsive sounds of the successful card-swiping, that swiping of the card is successful;

determining, if the recorded sounds at the proximity of the electronic device are the same as the responsive sounds of the failed card-swiping, that swiping of the card is not successful; and determining, if the recorded sounds at the proximity of the electronic device are neither the same as the responsive sounds of the successful card-swiping nor the failed card-swiping, that the swiping of the card is not successful.

11. The method according to claim 10, further comprising:

outputting a first message if the swiping of the card is determined to be successful; and outputting a second message if the swiping of the card is determined to be not successful.

12. The method according to claim 8, further comprising:

controlling the motion detecting device to acquire the motion data of the electronic device each time that a determined motion of card-swiping is performed;

determining the at least one predetermined range of motion data according to the motion data of the electronic device acquired by the motion detecting device; and storing the at least one predetermined range of motion data to the storage device.

13. The method according to claim 12, wherein the motion data comprises angular velocities and velocities, the at least one predetermined range of motion data comprises a predetermined range of angular velocities and a predetermined range of velocities.

14. The method according to claim 13, wherein methods of controlling a motion detecting device of the electronic device to acquire motion data of the electronic device, and determining whether the motion data of the electronic device is within a predetermined range of motion data comprise:

controlling the motion detecting device to acquire the angular velocity and the velocity of the electronic device at a first predefined time intervals within a predefined time range;

determining whether the acquired angular velocity of the electronic device is within the predetermined range of angular velocities; and determining whether the acquired velocity of the electronic device is within the predetermined range of velocities.

* * * * *